United States Patent
Park et al.

(10) Patent No.: US 6,671,775 B2
(45) Date of Patent: Dec. 30, 2003

(54) SPARE AREA MANAGEMENT METHOD OF OPTICAL RECORDING MEDIUM

(75) Inventors: Yong Cheol Park, Kyonggi-do (KR); Yong Hee Han, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/374,109

(22) Filed: Feb. 27, 2003

(65) Prior Publication Data

US 2003/0131190 A1 Jul. 10, 2003

Related U.S. Application Data

(63) Continuation of application No. 10/197,802, filed on Jul. 19, 2002, now Pat. No. 6,564,293, which is a continuation of application No. 09/443,319, filed on Nov. 19, 1999, now Pat. No. 6,453,384.

(30) Foreign Application Priority Data

Nov. 20, 1998 (KR) .............................................. 98-49937

(51) Int. Cl.$^7$ .............................................. G06F 12/00

(52) U.S. Cl. ........................ 711/112; 369/53.17; 714/7; 714/710

(58) Field of Search ................................. 711/112, 103; 369/47.14, 53.15, 53.17, 53.35, 54; 714/7, 710

(56) References Cited

U.S. PATENT DOCUMENTS

| | | | |
|---|---|---|---|
| 5,235,585 A | 8/1993 | Bish et al. | 369/54 |
| 5,241,531 A | 8/1993 | Ohno et al. | 369/275.2 |
| 5,535,328 A | 7/1996 | Harari et al. | 714/7 |
| 5,844,911 A | 12/1998 | Schadegg et al. | 714/710 |
| 6,031,804 A | 2/2000 | Yamamuro | 369/54 |

Primary Examiner—Nasser Moazzami
(74) Attorney, Agent, or Firm—Birch, Stewart, Kolasch & Birch, LLP

(57) ABSTRACT

A recording medium and a spare area management method for an optical recording medium are provided. The spare area management method utilizes an identification information to indicate whether a primary spare area is full or a supplementary spare area has been assigned or extended, as necessary. The spare area management method improves the performance of the driver by replacing a defective block with a spare block nearer to the defective block.

14 Claims, 8 Drawing Sheets

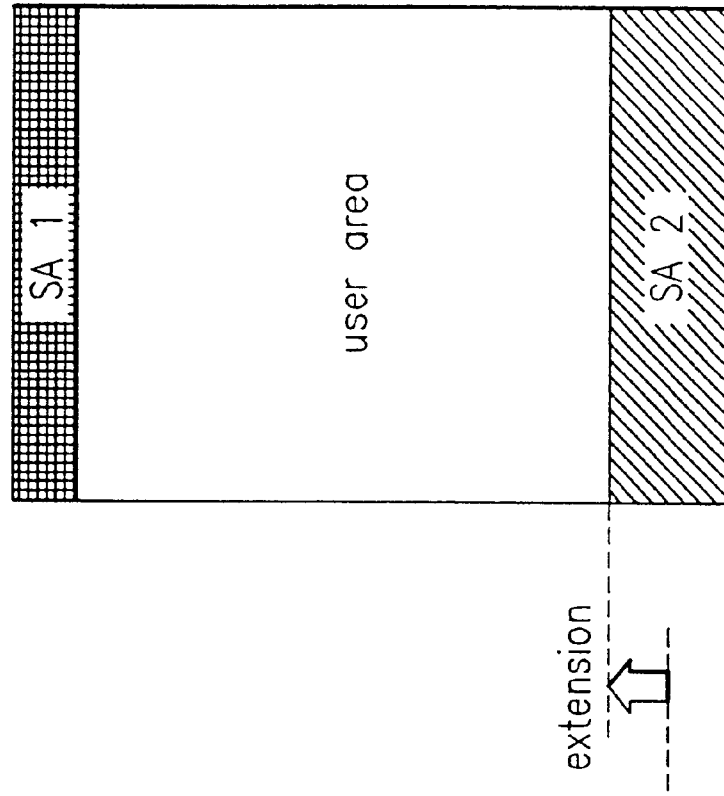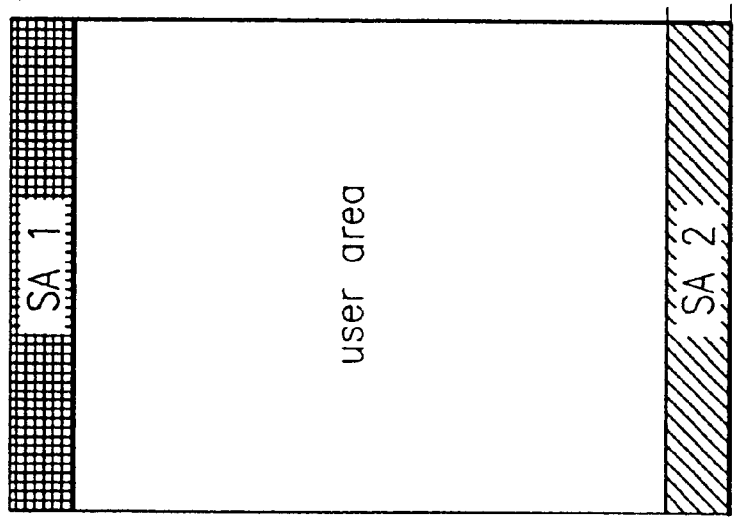

FIG.5

| b7 | | b1 | b0 |
|---|---|---|---|
| | | supplementary spare area full | primary spare area full | primary spare area full flag — 0b : spare block left in primary spare area

1b : spare block not left in primary spare area supplementary spare area full flag — 0b : spare block left in supplementary spare area 1b : spare block not left in supplementary spare area or supplementary spare area not assigned

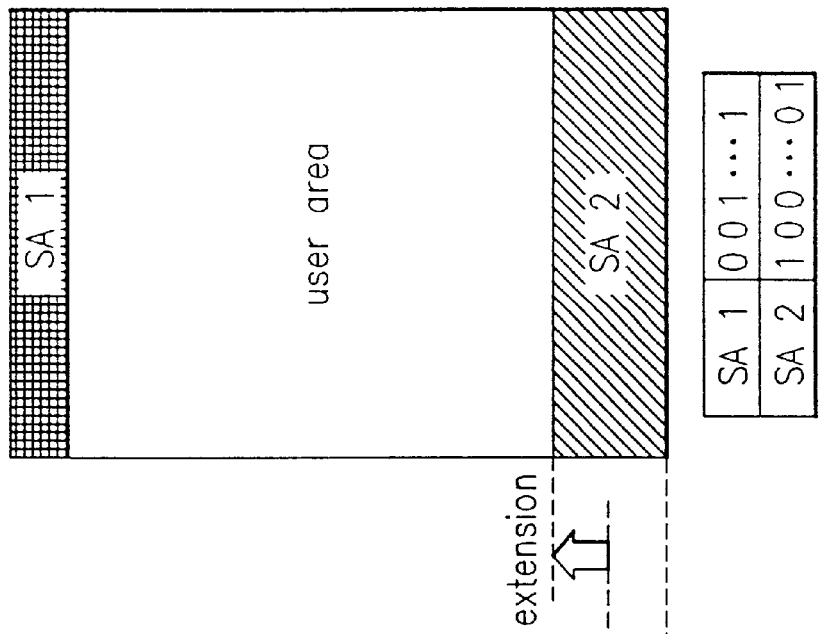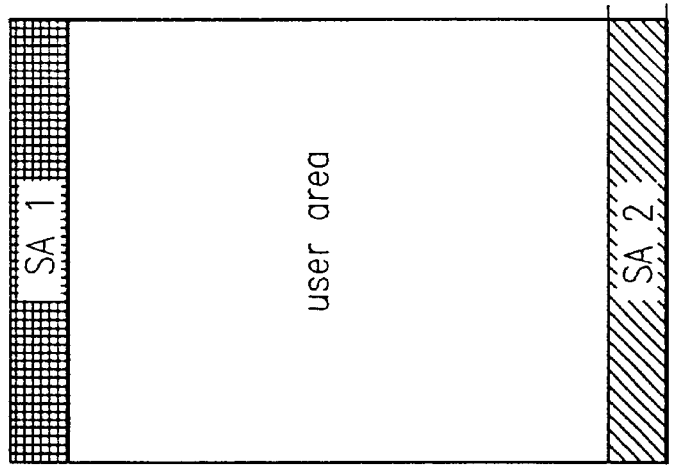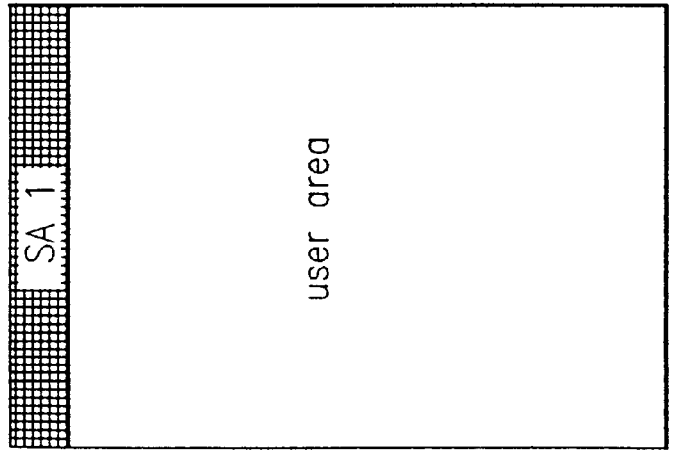

SPARE AREA MANAGEMENT METHOD OF OPTICAL RECORDING MEDIUM

This application is a continuation of application No. 10/197,802, filed on Jul. 19, 2002, now U.S. Pat. No. 6,564,293 issued on May 13, 2003, which is a continuation application under 37 C.F.R. 1.53(b) of pending prior application No. 09/443,319 filed on Nov. 19, 1999, now U.S. Pat. No. 6,453,384 issued on Sep. 17, 2002.

BACKGROUND OF THE INVENTION

1. Field of the Invention

The present invention relates to an optical recording medium and more particularly, to a spare area management method of a rewritable optical recording medium.

2. Discussion of Related Art

An optical storage medium is generally divided into a read only memory (ROM), a write once read many (WORM) memory into which data can be written one time, and rewritable memories into which data can be written several times. Rewritable optical storage mediums, i.e. optical discs, include rewritable compact discs (CD-RW) and rewritable digital versatile discs (DVD-RW, DVD-RAM, DVD+RW).

The operations of writing and playing back data in a rewritable optical disc may be repeated. This repeated process alters the ratio of storage layers for recording data into the optical disc from the initial ratio. Thus, the optical discs lose its characteristics and generate an error during recording/playback. This degradation appears as a defect area at the time of formatting, recording on or playing back from an optical storage medium. Also, defective areas of a rewritable optical disc may be caused by a scratch on its surface, particles of dirt and dust, or errors during manufacture. Therefore, in order to prevent writing into or reading out of the defective area, management of such defective areas is necessary.

FIG. 1 shows a defect management area (DMA) in a lead-in area and a lead-out area of the optical disc to manage a defect area. Particularly, the data area is divided into a plurality of zones for the defect area management, where each zone is further divided into a user area and a spare area. The user area is where data is actually written and the spare area is used when a defect occurs in the user area.

There are four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely initializing and re-initializing a disc. Each entry is composed of an entry type and a sector number corresponding to a defective sector. The SDL lists defective areas in block units, thereby storing entries of defective blocks occurring after formatting or defective blocks which could not be stored in the PDL during the formatting. Each SDL entry has an area for storing a sector number of the first sector of a block having defective sectors, an area for storing a sector number of the first sector of a block replacing the defective block, and reserved areas. Accordingly, defective areas, i.e. defective sectors or defective blocks, within the data area are replaced with normal or non-defective sectors or blocks by a slipping replacement algorithm and a linear replacement algorithm.

The slipping replacement algorithm is utilized when a defective area is recorded in the PDL. As shown in FIG. 2A, if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors. For example, if two defect sectors are registered in the PDL, the user area is slipped into two sectors of the spare area and data may occupy such two sectors of the spare area.

The linear replacement algorithm is utilized when a defective block is recorded in the SDL or when a defective block is found during playback. As shown in FIG. 2B, if defective blocks m and n, corresponding to blocks in either the user or spare area, are recorded on the SDL, such defective blocks are replaced by good blocks in the spare area and the data to be recorded in the defective block are recorded in an assigned spare area.

When replacing defective area with the spare area by utilizing either the slipping or linear replacement, the spare area may become full. If the spare area becomes full, a spare full flag is set to indicate that the spare area is full.

In a disc structure as shown in FIG. 1, a spare full flag exists in each zone and each spare full flag is set according to the status of the corresponding zone, i.e. if the zone is full. Therefore, when the spare area is required for a slipping or linear replacement, the spare full flag is checked to determine if the spare area in the corresponding zone is full, i.e. whether the spare full flag has been set. If the spare full flag has been set, a spare area of a zone in which the spare full flag has not been set is detected and utilized. However, if the spare full flags in all zones have been set, i.e. there is no more spare area, a slipping or linear replacement cannot be executed.

The spare area may be allocated in each zone as described above or may be allocated in a designated portion of the data area. As shown in FIG. 3, the spare area may be allocated on the top portion of the data area. In such case, the spare area is called a Primary Spare Area SA 1. Namely, the data area excluding the primary spare area becomes the user area.

The primary spare area is assigned in an initial formatting process without a logical sector number (LSN).

Thus, the primary spare area is assigned when a manufacturer produces the optical disc or when a user initially formats an empty disc. Also, the size of the primary spare area depends upon the size of the user area. For instance, to have an initial data recording capacity of 4.7 GB, shown in FIG. 3, the primary spare area of 26 MB is assigned. Moreover, when defective sectors are registered in the PDL according to the initial formatting or reformatting of the optical disc, data cannot be recorded in those defective sectors, reducing the recording capacity. Therefore, to maintain the initial data recording capacity, a portion of the primary spare area equivalent to the defective sectors registered on the PDL slips into or becomes a part of the user area during formatting. Accordingly, a physical sector number (PSN) of the user area to which a value of LSN=0 is assigned varies depending upon the defective sectors registered on the PDL.

If the primary spare area becomes full by slipping or linear replacement, as shown in FIG. 4A, a new spare area may be assigned, for example near the end of the user area. Such additional spare area is called a supplementary spare area (SA 2). If the assigned supplementary spare area also becomes full, an extension of the assigned supplementary spare area may be made when necessary as shown in FIG. 4B.

As described above, the assignment of the primary spare is fixed while the supplementary spare area is newly assigned or extendable if necessary. However, in the disc structure as shown in FIGS. 4A and 4B, there is a need to indicate separately whether the primary spare area is full, whether the supplementary spare area has been assigned, or the status of the supplementary spare area as it is extended.

SUMMARY OF THE INVENTION

Accordingly, an object of the present invention is to solve at least the problems and disadvantages of the related art.

An object of the invention is to provide a spare area management method of an optical recording medium which can indicate whether a primary spare area is full and whether a supplementary spare area has been assigned.

Another object of the invention is to provide a spare area management method of an optical recording medium which can indicate whether the spare area is available for a linear replacement.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

According to one aspect of the present invention, a method is provided for managing a spare area in a recording medium, the spare area including a first spare area and a second spare area. The method includes: determining whether the first spare area or second spare area is in an active state to replace a defective block with a replacement block; checking whether or not the first spare area or the second spare area is full based on first and second state information, the first state information indicating whether or not the first spare area is full, the second state into indicating whether or not the second spare area is full; and performing a linear replacement for the defective block using a spare block of either the first spare area or the second spare area when at least one of the first spare area and second spare area is in the active state, and one of the first spare area and second spare is not full.

According to one aspect of the present invention, a method is provided for managing a spare area in a recording medium, the spare area including a first spare area and a second spare area. The method includes: determining whether the first spare area and the second spare area are assigned; and setting first and second identifications for identifying the first spare area and the second spare area respectively, the first and second identifications including status information to indicate whether or not the first spare area and the second spare area are full, respectively, wherein the status information of the second spare area further indicates whether or not the second spare area is assigned based on the determining.

According to one aspect of the present invention, a method is provided for managing a spare area in a recording medium, the spare area including a first spare area and a second spare area. The method includes: determining whether the first spare area and the second spare area are assigned; and setting first and second identifications for identifying the first spare area and the second spare area respectively, the first and second identifications including status information to indicate whether or not the first spare area and the second spare area are full respectively, wherein the status information for the second spare area is set at least differently before and after an assignment of the second spare area.

According to one aspect of the present invention, a method is provided for managing a spare area in a recording medium, the spare area including a first spare area and a second spare area. The method includes: determining whether the first spare area and the second spare area are assigned; and setting first and second identifications for identifying the first spare area and the second spare area respectively, the first and second identifications including status information to indicate whether or not the first spare area and the second spare area are full respectively, wherein the status information of the second spare area is set at least at the same value to indicate whether or not the second spare area is full, or whether or not the second spare area is assigned.

According to one aspect of the present invention, a recording medium includes: a main data area; a first and second spare areas, at least one of the first spare area and the second spare area having a replacement block for replacing a defective block of a main data block; and a control information area including a status information to determine whether the first spare area or the second spare area is in an active state to replace a defective block with a replacement block, and to check whether or not the first spare area or the second spare area is full, wherein a linear replacement is preformed for the defective block using a spare block of either the first spare area or the second spare area when at least one of the first spare area and the second spare area is in the active state, and one of the first spare area and the second spare area is not full.

According to one aspect of the present invention, a recording medium includes: a spare area including a first spare area and a second spare area; and a control information area including status information to determine whether the first spare area and the second spare area are assigned, and to indicate whether or not the first spare area and the second spare area are full, wherein the status information for the second spare area further indicates whether or not the second spare area is assigned.

According to one aspect of the present invention, a recording medium includes: a spare area including a first spare area and a second spare area; and a control information area including status information to determine whether the first spare area and the second spare area are assigned, and to indicate whether or not the first spare area and the second spare area are full, wherein the status information for the second spare area is set at least differently before and after an assignment of the second spare area.

According to one aspect of the present invention, a recording medium includes: a spare area including a first spare area and a second spare area; and a control information area including status information to determine whether the first spare area and the second spare area are assigned, and to indicate whether or not the first spare area and the second spare area are full, wherein the status information for the second spare area is set at least at the same value to indicate whether or not the second spare area is full, or whether or not the second spare area is assigned.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The invention will be described in detail with reference to the following drawings in which like reference numerals refer to like elements wherein:

FIGS. 4A and 4B show a supplementary spare area assigned and extended on the disc where the primary spare area is assigned as in FIG. 3;

FIG. 5 shows a structured where flags are added to indicate whether a primary spare area is full and a supplementary spare area is used on the optical recording medium according to an embodiment of the present invention;

Figure 8:
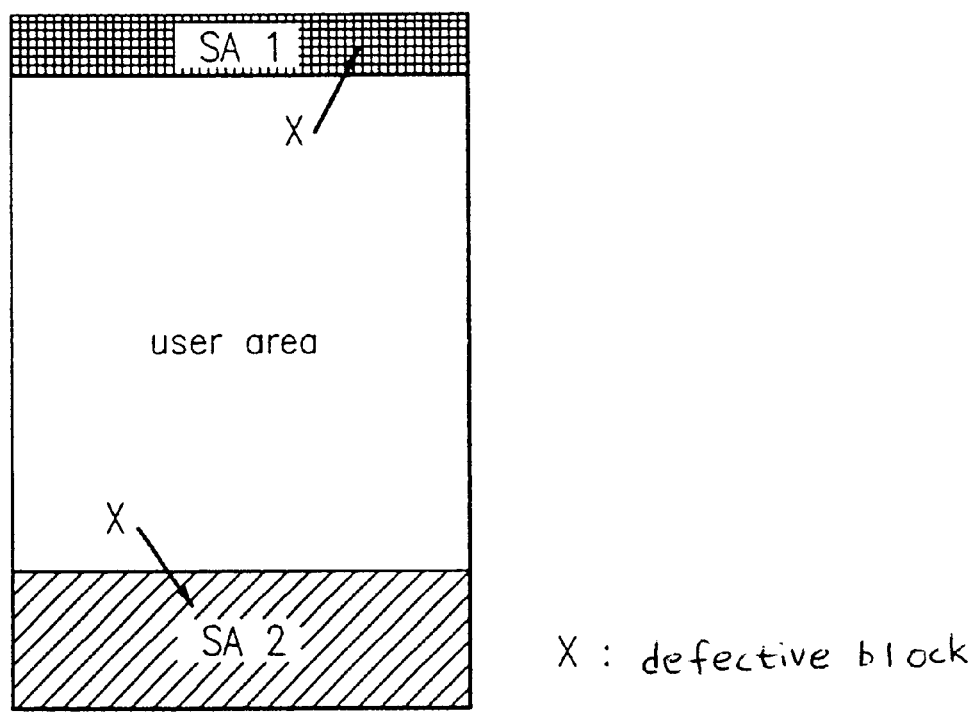

FIGS. 7A to 7C are another exemplary views illustrating primary and supplementary spare area flags whose values are varied in accordance with the status of the primary spare area and the supplementary spare area according to an embodiment of the present invention; and FIG. 8 shows a linear replacement of the data on a defect block with the spare area nearest the defect block in a defect area management method of an optical recording medium according to the present invention.

DETAILED DESCRIPTION OF PREFERRED EMBODIMENTS

Reference will now be made in detail to the preferred embodiments of the present invention, examples of which are illustrated in the accompanying drawings.

The present invention is generally directed to a spare area management method of an optical recording medium which can indicate by means of identification information whether a primary spare area assigned on the top portion of data area is full or a supplementary spare area assigned on the bottom portion of the data area is available.

The identification information is recorded independently from the primary and supplementary spare areas. In the present invention, for the convenience of an explanation, the identification information for indicating whether the primary spare area is full will be called 'a primary spare area full flag' and the identification information for indicating whether the supplementary spare area is assigned or available will be called 'a supplementary spare area full flag'.

FIG. 5 shows a data structure where the primary and supplementary spare area full flags are added on the optical recording medium according to an embodiment of the present invention. Particularly, the primary and supplementary spare area full flags may be added on a non-used area of the DMA, particularly the SDL or DDS. The primary and supplementary spare area full flags are added to indicate whether the primary and supplementary spare areas are full, respectively.

For example, if the primary spare area is available, i.e. the spare block for a linear replacement is left, the primary spare area full flag is reset to a value of '0'. If the spare block is not available, i.e. the spare area is full, the primary spare area full flag is set to a value of '1'.

Unlike the primary spare area full flag, the supplementary spare area full flag is set differently before and after an assignment of the supplementary spare area. Namely, the supplementary spare area full flag is added to indicate whether the supplementary spare area has been assigned before the assignment of the supplementary spare area, and added to indicate whether the supplementary spare area is full after the assignment of the supplementary spare area.

For example, if the supplementary spare area has not been assigned, the supplementary spare area full flag is set to a value of '1', and when the supplementary spare area is assigned, the supplementary spare area full flag is set to a value of '0'. After the supplementary spare area has been assigned, however, if there is available area within the supplementary spare area, i.e. the spare block for the linear replacement is left, the supplementary spare area full flag remains the value of 0'. Thereafter, once the spare block is not available, i.e. the spare area is full, the supplementary spare area full flag is set to the value of '1'.

Also, the method of assigning and extending the supplementary spare area may be classified into two methods. Generally, in the first method according to the present invention, if the primary spare area is full, the supplementary spare area is assigned and if the assigned supplementary spare area is full, the supplementary spare area is extended. In the second method according to the present invention, if a predetermined area, for example 1 MB, is left within the primary spare area, the supplementary spare area is assigned and if a predetermined area is left within the supplementary spare area, the supplementary spare area is extended.

The second method may utilize one active mode, in which the supplementary spare area is assigned when the primary spare area is still left, but is not used for the linear replacement until the primary spare area is full. Similarly, the extended supplementary spare area is not used for the linear replacement until the assigned supplementary spare area is full. Namely, the one active mode means that the primary and supplementary spare areas are not simultaneously active and when the supplementary spare area is extended, the supplementary spare areas are not simultaneously active.

The various states of the primary and supplementary spare area full flags in the one active mode are shown in FIGS. 6A–6C and FIGS. 7A–7C according to the embodiments of the present invention.

Figure 1:
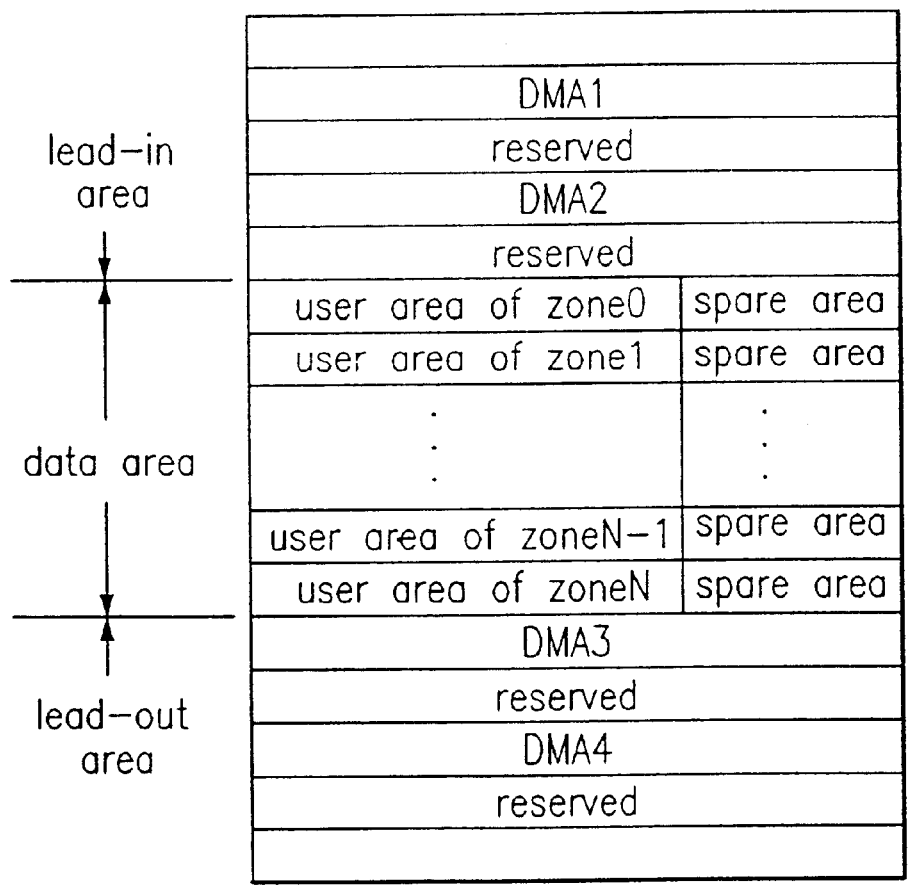
FIG. 1 shows a data area configuration of a general optical disc in the related art.
Figure 2A:
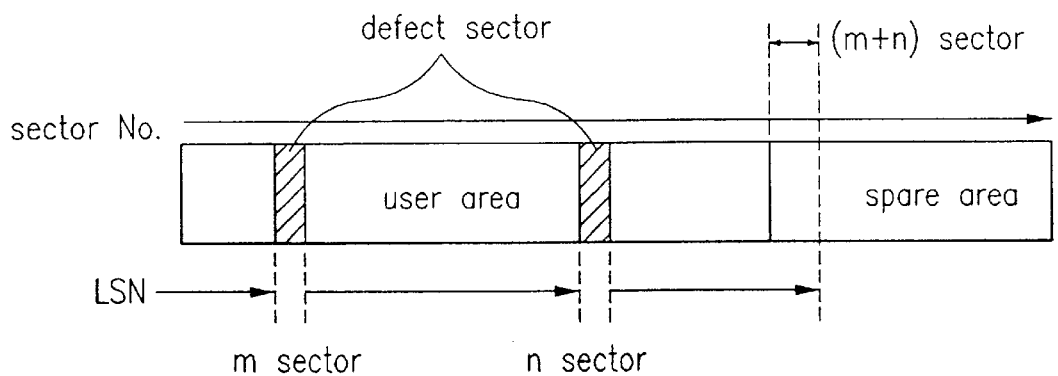
FIG. 2A shows a slipping replacement method for a defect area in the related art.
Figure 2B:
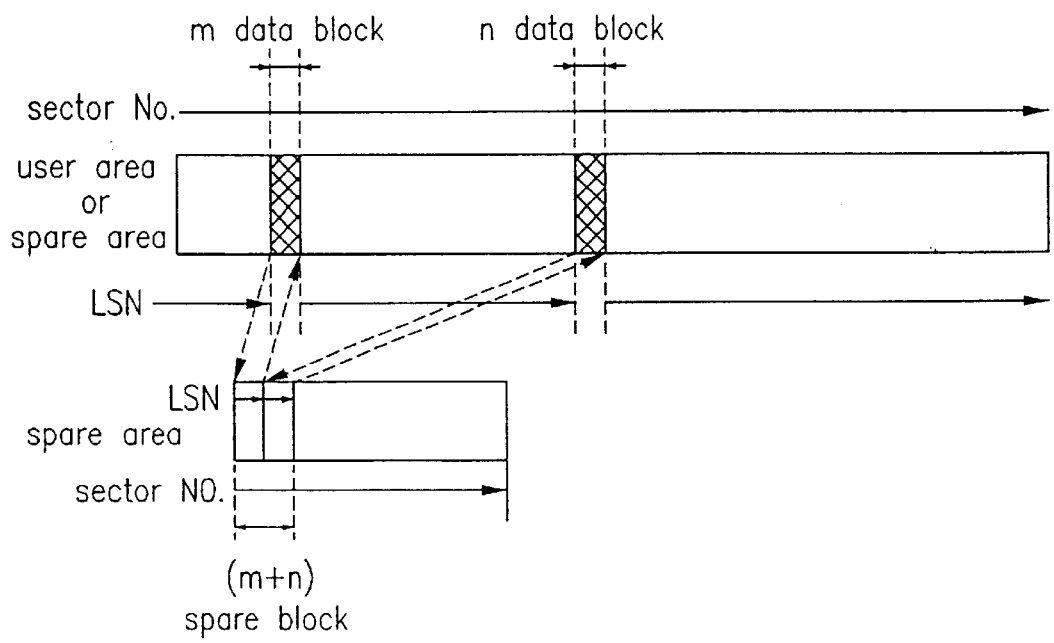
FIG. 2B shows a linear replacement method for a defect area in the related art.
Figure 3:
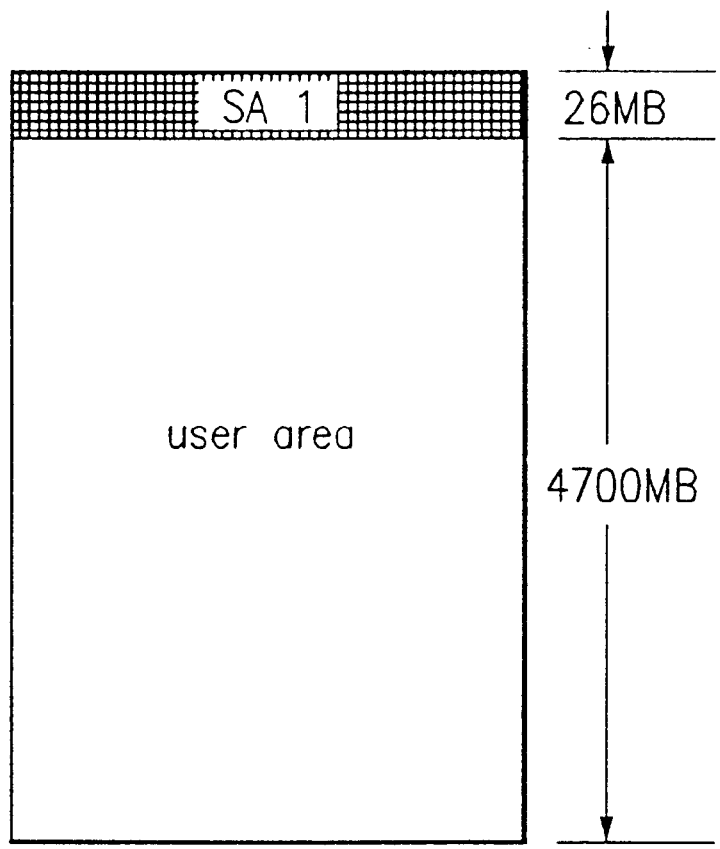
FIG. 3 shows a spare area assigned at the top portion of the data area.
Figure 6A:
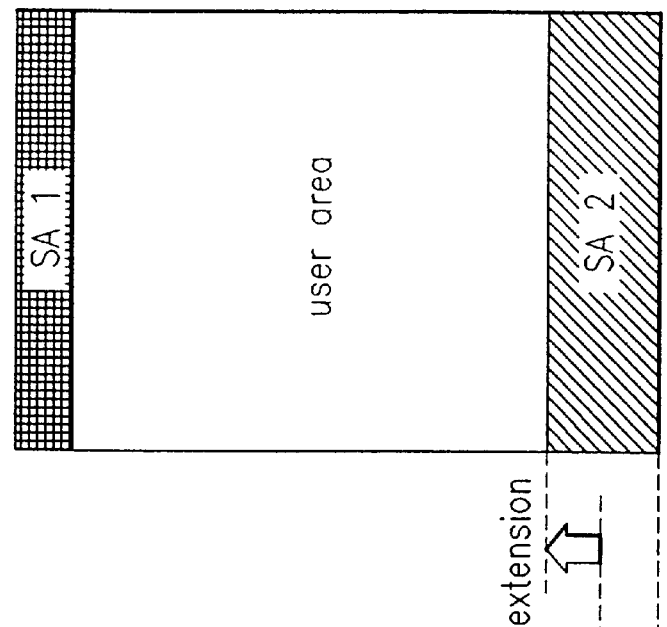
FIGS. 6A to 6C are exemplary views illustrating primary and supplementary spare area flags whose values are varied in accordance with the status of the primary spare area and the supplementary spare area according to an embodiment of the present invention.
Figure 6B:
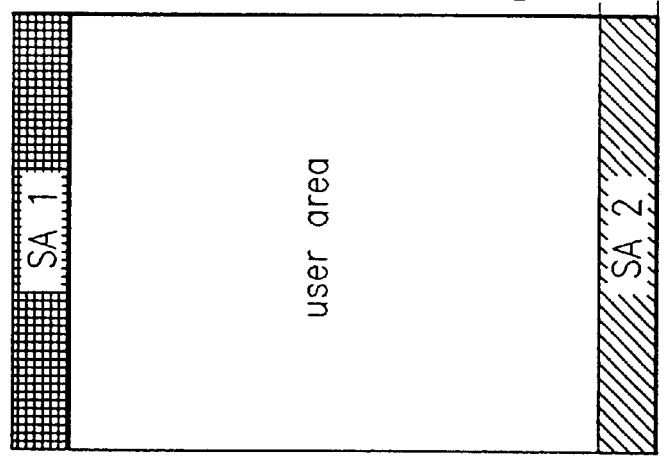
Figure 6C:
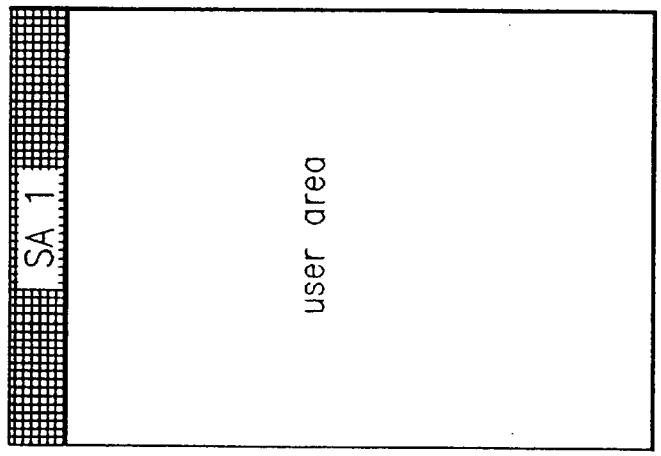

Referring to FIGS. 6A to 6C, the primary spare area is assigned upon formatting, and if necessary, i.e. if the primary spare area is full, the supplementary spare area is assigned. Thereafter, if the assigned supplementary spare area becomes full, the supplementary spare area is extended. In particular, upon formatting, the primary spare area full flag is reset to a value of '0' and the supplementary spare area full flag is set to a value of '1', as shown in FIG. 6A. Next, if the primary spare area is full for the linear replacement, the primary spare area full flag is set to a value of '1', also shown in FIG. 6A. Since the primary spare area is not extendable, the primary spare area full flag remains the value of '1', as shown in FIGS. 6B and 6C.

The identification information for the spare area which differentiates the assignment, full state and extension of the supplementary spare area is by means of the supplementary spare area full flag. For example, the supplementary spare area full flag is initially set to a value of '1' as shown in FIG. 6A in a state where the supplementary spare area has not been assigned. If the supplementary spare area is assigned as necessary, the supplementary spare area full flag is reset to a value of '0'. Thus, when the primary spare area is full and the supplementary spare area is newly assigned, the primary spare area full flag remains a value of '1' and the supplementary spare area full flag is reset to the value '0', as shown in FIG. 6B.

Thereafter, if the assigned supplementary spare area becomes full for a linear replacement, the supplementary spare area full flag is set to a value of '1', as shown in FIG. 6B. However, if the supplementary spare area is extended, the supplementary spare area is then reset to the value of '0'. In other words, since the supplementary spare area is extendable, the supplementary spare area full flag is repetitively reset to the value of '0' from the value of '1' each time the spare area is extended, as shown in FIG. 6C. However, when the supplementary spare area cannot be further extended, the supplementary spare area full flag maintains at the value of '1'.

Referring to FIGS. 7A to 7C, in another example, the primary spare area is also assigned upon formatting, and the supplementary spare area is assigned if a predetermined area within the primary spare area is left. Thereafter, if a predetermined area within the assigned supplementary spare area is left, the supplementary spare area is extended. In particular, upon formatting, the primary spare area full flag is reset to a value of '0' and the supplementary spare area full flag is set to a value of '1', as shown in FIG. 7A. Next, if a predetermined area in the primary spare area for the slipping or linear replacement is left, the supplementary spare area is assigned. At this time, the supplementary spare area full flag is converted from the value of '1' to a value '0', as shown in FIG. 7B. However, since the primary spare area is not full, the primary spare area full flag maintains the value of '0'. Once the primary spare area becomes full, the primary spare area full flag is set to the value '1'. Because the supplementary spare area is assigned and extended in the one active mode, the supplementary spare area is not used for a linear replacement before the primary spare area becomes full, even if the supplementary spare area has been already assigned.

Similarly, if a predetermined area within the assigned supplementary spare area is left, the supplementary spare area is additionally extended. At this time, the supplementary spare area full flag maintains the value '0' since the supplementary spare area would not be in a full state due to the extension. If the supplementary spare area cannot be further extended, the supplementary spare area full flag is set to a value of '1', as shown in FIG. 7C.

In the above embodiment, the supplementary spare area may not be further extended because data is recorded in the area needed for the extension of the supplementary spare area. In such case, the supplementary spare area full flag is reset to the value of '0' if data recorded on the area to be extended is erased and thereby the supplementary spare area is extended. However, once the supplementary spare area cannot be further extended, the supplementary spare area full flag is set to a value of '1', as shown in FIG. 7C.

Moreover, since the supplementary spare area is assigned and extended in the one active mode, the extended supplementary spare area is not used for a linear replacement before the assigned supplementary spare area becomes full, even if the supplementary spare area is already extended in a state where a predetermined area within the supplementary spare area is left.

In the above embodiments, the primary spare area is assigned prior to the assignment of the supplementary spare area. However, the primary and supplementary spare areas may be simultaneously assigned upon a formatting, in which the primary and supplementary spare area full flags are all reset to a value of '0'.

Furthermore, when the spare area is active in the one active mode, the performance of a linear replacement may be degraded. Namely, the linear replacement method is executed by moving an optical pick-up to and from the spare area to record the data of the defective block on a replacement block in the spare area. However, since the spare area exists on certain parts of the data area, the replacement time period for a defective block far from the spare area can be substantial. To solve this problem, the spare area may be active in a two active mode.

When a defective block is discovered during a recording or playback of data to or from the optical disc in which a spare area has been assigned, the defective block is replaced with a spare block of the spare area nearest to the defective block, as shown in FIG. 8. By replacing the defective block with a nearby spare area, the performance of the driver can be significantly improved. At this time, if only the primary spare area is assigned, the primary spare area is used for a linear replacement. However, when both the primary and supplementary spare areas are assigned, an appropriate spare area, i.e. a nearby spare area, is used for a linear replacement.

In this two active mode, the data of a defective block is linearly replaced with a spare block of the spare area located at a position which results in the shortest moving distance of the optical pick-up. If all assigned spare areas are active irrespective of whether the spare area is the primary or supplementary spare area, and if a spare block within the primary and supplementary spare areas is left, the data of a defective block is linearly replaced with a spare block of any area within the primary or supplementary spare area which meets the above criteria. For example, the data of a defective block on the inner peripheral side of an optical medium, i.e. near the top of the data area, is linearly replaced with a spare block of the primary spare area. On the other hand, the data of a defective block on the outer peripheral side of an optical medium, i.e. near the bottom of the data area, is linearly replaced with a spare block of the supplementary spare area.

Unlike the one active mode in the two (multiple) active mode, the entire supplementary spare area would be active irrespective of whether an area is an extension. Also, when both the primary and supplementary spare areas are simultaneously active, the spare area to be used for a linear replacement is determined by first checking whether each spare area is full.

For example, if a defective block is nearer to the primary spare area, the primary spare area full flag is checked. At this time, if the primary spare area full flag is set to a value of '0' as shown in FIG. 7A, the data of the defective block is linearly replaced with a spare block of the primary spare area. On the other hand, if the primary spare area full flag is set to a value of '1', the supplementary spare area full flag is checked. If the supplementary spare area full flag is set to a value of '0' as shown in FIG. 7B, the data of the defective block is linearly replaced with a spare block of the supplementary spare area. This is generally shown in FIG. 8.

Therefore, upon a detection of a defective block, if any one of the spare area is full, the spare area in the full state is not used for a linear replacement. Also, if the supplementary spare area is additionally extended, the supplementary spare area full flag is reset to a value of '0' until the supplementary spare area cannot be further extended, as described with reference to the one active mode. Thus, when the supplementary spare area cannot be extended, the supplementary spare area full flag is set to a value of '1' as shown in FIG. 7C. Accordingly, if both of the primary and supplementary spare area full flags are set to the value of '1', a defective block management cannot be further performed using a slipping or linear replacement.

As set forth above, a spare area management method of an optical recording medium according to the present invention can indicate by means of an identification information whether a primary spare area is full or a supplementary spare area has been assigned or extended, as necessary. Thus, the present invention indicates when a linear replacement cannot be executed because the spare area is in a full state. In addition, a spare area management method of an optical recording medium according to the present invention can replace a defective block with the spare block of the spare area nearer to the defective block, thereby improving the driver's performance upon the linear replacement. Moreover, the present invention is applicable to any optical or other type of medium having the same format with an assignment of primary spare area and a supplementary spare area.

The foregoing embodiments are merely exemplary and are not to be construed as limiting the present invention. The present teachings can be readily applied to other types of apparatuses, systems, and/or mediums. The description of the present invention is intended to be illustrative, and not to limit the scope of the claims. Many alternatives, modifications, and variations will be apparent to those skilled in the art.

What is claimed is:

1. A method for managing a spare area in a recording medium, the spare area including a first spare area and a second spare area, the method comprising:
   (a) determining whether the first spare area or second spare area is in an active state to replace a defective block with a replacement block;
   (b) checking whether or not the first spare area or the second spare area is full based on first and second state information, the first state information indicating whether or not the first spare area is full, the second state information indicating whether or not the second spare area is full; and
   (c) performing a linear replacement for the defective block using a spare block of either the first spare area or the second spare area when at least one of the first spare area and second spare area is in the active state, and one of the first spare area and second spare is not full.

2. The method of claim 1, wherein the first spare area is located in an inner side of the recording medium, and the second spare area is located in an outer side of the recording medium.

3. The method of claim 1, wherein said (c) performs the linear replacement for the defective block using a spare block of either the first spare area or the second spare area which is nearer to the defective block when the first spare area and second spare area are in the active state, and the first spare area and second spare area are not full.

4. A method for managing a spare area in a recording medium, the spare area including a first spare area and a second spare area, the method comprising:
   determining whether the first spare area and the second spare area are assigned; and
   setting first and second identifications for identifying the first spare area and the second spare area respectively, said first and second identifications including status information to indicate whether or not the first spare area and the second spare area are full, respectively,
   wherein the status information of the second spare area further indicates whether or not the second spare area is assigned based on said determining.

5. A method for managing a spare area in a recording medium, the spare area including a first spare area and a second spare area, the method comprising:
   determining whether the first spare area and the second spare area are assigned; and
   setting first and second identifications for identifying the first spare area and the second spare area respectively, said first and second identifications including status information to indicate whether or not the first spare area and the second spare area are full respectively,
   wherein the status information for the second spare area is set at least differently before and after an assignment of the second spare area.

6. The method of claim 5, wherein the status information for the second spare area is set to a certain value before an assignment of the second spare area, and the status information for the second spare area is set to another value after the assignment of the second spare area and when the second spare area is not full.

7. A method of managing a spare area in a recording medium, the spare area including a first spare area and a second spare area, the method comprising:
   determining whether the first spare area and the second spare area are assigned; and
   setting first and second identifications for identifying the first spare area and the second spare area respectively, said first and second identifications including status information to indicate whether or not the first spare area and the second spare area are full respectively,
   wherein the status information of the second spare area is set at least to the same value to indicate whether or not the second spare area is full, or whether or not the second spare area is assigned.

8. The method of claim 7, wherein the status information for the second spare area is set to a certain value when the second spare area is full and the second spare area is not assigned.

9. A recording medium comprising:
   a main data area;
   a first and second spare areas, at least one of the first spare area and the second spare area having a replacement block for replacing a defective block of a main data block; and
   a control information area including a status information to determine whether the first spare area or the second spare area is in an active state to replace a defective block with a replacement block, and to check whether or not the first spare area or the second spare area is full, wherein a linear replacement is preformed for the defective block using a spare block of either the first spare area or the second spare area when at least one of the first spare area and the second spare area is in the active state, and one of the first spare area and the second spare area is not full.

10. The recording medium of claim 9, wherein the first spare area is located in an inner side of the recording medium, and the second spare area is located in an outer side of the recording medium.

11. The recording medium of claim 9, wherein the linear replacement is performed for the defective block using a spare block of either the first spare area or the second spare area which is nearer to the defective block when the first spare area and the second spare area are in the active state, and the first and second spare areas are not full.

12. A recording medium comprising:

a spare area including a first spare area and a second spare area; and a control information area including status information to determine whether the first spare area and the second spare area are assigned, and to indicate whether or not the first spare area and the second spare area are full, wherein the status information for the second spare area further indicates whether or not the second spare area is assigned.

13. A recording medium comprising:

a spare area including a first spare area and a second spare area; and a control information area including status information to determine whether the first spare area and the second spare area are assigned, and to indicate whether or not the first spare area and the second spare area are full, wherein the status information for the second spare area is set at least differently before and after an assignment of the second spare area.

14. A recording medium comprising:

a spare area including a first spare area and a second spare area; and a control information area including status information to determine whether the first spare area and the second spare area are assigned, and to indicate whether or not the first spare area and the second spare area are full, wherein the status information for the second spare area is set at least to the same value to indicate whether or not the second spare area is full, or whether or not the second spare area is assigned.

* * * * *